United States Patent
Toyama

[11] Patent Number: 5,810,643
[45] Date of Patent: Sep. 22, 1998

[54] WIRE SAW CUTTING METHOD SYNCHRONIZING WORKPIECE FEED SPEED WITH WIRE SPEED

[75] Inventor: Kohei Toyama, Shirakawa, Japan

[73] Assignee: Shin-Etsu Handotai Co., Ltd., Tokyo, Japan

[21] Appl. No.: 670,724

[22] Filed: Jun. 21, 1996

[30] Foreign Application Priority Data

Jun. 22, 1995 [JP] Japan .................................... 7-155730
Jun. 20, 1996 [JP] Japan .................................... 8-159565

[51] Int. Cl.⁶ .................................................... B24B 1/00
[52] U.S. Cl. .................................... 451/5; 125/21; 83/13
[58] Field of Search ................................. 83/13, 16, 171, 83/437.4, 437.2, 425.2, 425.3, 789, 794, 801, 808, 651.1; 125/21, 16.02, 16.01; 451/5

[56] References Cited

U.S. PATENT DOCUMENTS

| | | | |
|---|---|---|---|
| 3,942,508 | 3/1976 | Shimizu | 125/21 X |
| 4,187,827 | 2/1980 | Regler et al. | 125/16.01 |
| 4,494,523 | 1/1985 | Wells | 125/21 X |
| 4,574,769 | 3/1986 | Ishikawa | 125/16.01 |
| 4,903,682 | 2/1990 | Kurokawa | 125/21 X |
| 5,052,366 | 10/1991 | Matsukura | 125/16.01 |
| 5,201,305 | 4/1993 | Takeuchi | 125/21 |
| 5,226,403 | 7/1993 | Toyama | 125/13.02 X |
| 5,269,285 | 12/1993 | Toyama et al. | 125/21 X |
| 5,313,741 | 5/1994 | Toyama | 125/13.02 X |

Primary Examiner—Maurina T. Rachuba
Attorney, Agent, or Firm—Nikaido, Marmelstein, Murray & Oram LLP

[57] ABSTRACT

A wire saw slicing method capable of slicing a workpiece into wafers having a flat shape free from undulations (waviness) includes feeding the workpiece or a wire along a linear feed path to force them together, and reciprocating the wire in the axial direction. A first cyclic pattern of the feed speed of the workpiece or the wire and a second cyclic pattern of the reciprocating speed of the wire are set in such a relation that the first and second cyclic patterns are synchronized at least during a time period of one of the modes of the respective cyclic patterns.

11 Claims, 8 Drawing Sheets

WIRE SAW CUTTING METHOD SYNCHRONIZING WORKPIECE FEED SPEED WITH WIRE SPEED

BACKGROUND OF THE INVENTION

1. Field of the Invention:

The present invention relates to a wire saw slicing apparatus and a slicing method for cutting off or slicing a workpiece, such as a silicon semiconductor single crystal ingot, into wafer-like slices with no surface irregularities and kerf loss involved and with good yield resulting therefrom.

2. Description of the Related Art:

Wire saws are used for cutting off or slicing a workpiece, such as a semiconductor single crystal ingot, into wafers by reciprocating a plurality of parallel regularly spaced lines of wire in the axial direction while feeding the workpiece relatively to the wire along a linear path to force the workpiece against the wire, with an abrasive-containing working fluid continuously supplied to a contact area between the workpiece and the wire lines. The wire saws are advantageous in that a multiplicity of wafers of the same thickness can be produced at one time. A slicing time required for each slicing run or operation is about 6 hours for a silicon semiconductor ingot having a diameter of 5 inches. In an alternative arrangement, the wire, like the workpiece in the foregoing arrangement, is fed relatively to the workpiece along a linear path to force the wire against the workpiece. In a description given below, only the first-mentioned arrangement incorporating a linear movement of the workpiece (in a downward direction, in general) will be described. It is obvious, however, that the second-mentioned arrangement incorporating a linear movement of the wire can be applied to in the same manner as the first-mentioned arrangement.

The sliced wafers ideally have the shape of a completely flat disk. In reality, however, their shape deviates from the ideal shape and are most likely to have a deformation called "sori" (warp or bow) observed, respectively, as a concave or a convex and an S-shaped deformation having a relatively large periodicity or radius of curvature, or a deformation called "undulations (waviness)" appearing an surface irregularities having a periodicity of several millimeters to several tens millimeters. The deformation of "sori" (warp or bow) and the deformation of undulations (waviness) cannot be removed by a subsequent wafer-finishing process such as lapping process because the wafers undergo elastic deformation under loads exerted thereon during the lapping process. In view of progressive microminiaturization of the electronic circuit, the deformation of "sori" (warp or bow) and undulations (waviness) of the as sliced wafers affects the yield of semiconductor devices formed on the wafers.

The deformation of "sori" (warp or bow) is generated due to variations of pitch of a wire wound around main rollers of the wire saw slicing machine, which are caused due to thermal expansion of the main rollers under frictional heat generated during the slicing process. To deal with this problem, various means for cooling the main rollers during the slicing process have been proposed.

The proposed method is able to preclude the generation of the deformation of "sori" (warp or bow) by cooling the main rollers for keeping the constant wire pitch. However, the deformation of undulations (waviness) on the as-sliced wafer cannot be avoided by the proposed method because the deformation of undulations (waviness) is considered to be generated under the effect of variations of feed speed of the workpiece relative to the wire taken in combination with temporary stops at opposite ends of reciprocating movement of the wire where the wire changes its direction of movement.

SUMMARY OF THE INVENTION

With the foregoing difficulties in view, it is an object of the present invention to provide a wire saw slicing apparatus and a wire saw slicing method which are capable of slicing a workpiece, such an a silicon semiconductor single crystal ingot, into waters having a uniform shape free from undulations (waviness).

In brief, according to a wire saw slicing apparatus and a wire saw slicing method of the present invention, the linear feed speed of the workpiece relative to the wire is regulated in synchronism with the reciprocating movement of the wire recurring in a cycle pattern of stopping, accelerating, continuing at a constant speed, decelerating, and stopping, or of stopping, accelerating, decelerating and stopping, so that the workpiece in sliced are the workpiece is fed linearly through a time period during which the wire is reciprocating at a sufficient speed for slicing.

In one aspect the invention provides a wire saw slicing apparatus of the type in which a plurality of parallel, regularly spaced lines of a wire and a workpiece are relatively fed toward each other alone a linear feed path to force them together while reciprocating the wire in the axial direction to slice the workpiece into wafers, with a slurry supplied to a contact area between the wire and the workpiece, the wire saw slicing apparatus comprising: (a) means for feeding one of the workpiece and the wire relative to the other along the linear feed path to force them together (b) means for reciprocating the wire in the axial direction (c) means for setting a cycle pattern of the feed speed of the workpiece or the wire which recurs in a sequence of stopping, accelerating, continuing at a constant speed, decelerating, and stopping, and a cycle pattern of the reciprocating speed of the wire which recurs in a sequence of stopping, accelerating, continuing at a constant speed, decelerating, and stopping, the two cycle patterns being synchronized with each other at least through a time period during which the feed speed and the reciprocating speed continue at the respective constant speeds; and (d) means for controlling the operation of the feeding means and the reciprocating means according to the first and second cycle patterns met by the setting means.

In a second preferred form of the present invention, there is provided a wire saw slicing apparatus of the type in which a plurality of parallel, regularly spaced lines of a wire and a workpiece are relatively fed toward each other along a linear feed path to force them together while reciprocating the wire in the axial direction to slice the workpiece into wafers, with a slurry supplied to a contact area between the wire and the workpiece, the wire saw slicing apparatus comprising: (a) means for feeding one of the workpiece and the wire relative to the other along the linear feed path to force them together (b) means for reciprocating the wire in the axial direction; (c) means for setting a cycle pattern of the feed speed of the workpiece or the wire which recurs in a sequence of stopping, accelerating, continuing at a constant speed, decelerating, and stopping, and a cycle pattern of the reciprocating speed of the wire which recurs in a sequence of stopping, accelerating, continuing at a constant speed, decelerating, and stopping, the two cycle patterns being synchronized with each other at least at the time of the stopping of the respective speeds; and (d) means for controlling the operation of the feeding means and the reciprocating means according to the first and second cycle patterns set by the setting means.

In the first and second preferred forms of the present invention, the two cycle patterns are preferably synchronized with each other at least at the time of the stopping of the respective speeds and through a time period during which the feed speed and the reciprocating speed continue at the respective constant speeds.

In a third preferred form of the present invention, there is provided a wire saw slicing apparatus of the type in which a plurality of parallel, regularly spaced lines of a wire and a workpiece are relatively fed toward each other along a linear feed path to force them together while reciprocating the wire in the axial direction to slice the workpiece into wafers, with a slurry supplied to a contact area between the wire and the workpiece, the wire saw slicing apparatus comprising: (a) means for feeding one of the workpiece and the wire relative to the other along the linear feed path to force them together; (b) means for reciprocating the wire in the axial direction; (a) means for setting a cycle pattern of the feed speed of the workpiece or the wire which recurs in a sequence of stopping, accelerating, decelerating, and stopping, and a cycle pattern of the reciprocating speed of the wire which recurs in a sequence of stopping, accelerating, decelerating, and stopping, the two cycle patterns being synchronized with each other at least at the time of the stopping of the respective speeds; and (d) means for controlling the operation of the feeding means and the reciprocating means according to the first and second cycle patterns set by the setting means.

In the third preferred form, at least one of the two cycle patterns may further have a mode of continuing at a constant speed provided between the accelerating and the decelerating.

In any of the preferred forms previously described, the two cycle patterns set by the setting means are preferably composed of a repetition of a unit pattern. Furthermore, it is preferable that each of the two cycle patterns set by the setting means are basically composed of a repetition of a unit pattern, and wherein the feed speed of the workpiece or the wire in the continuing at a constant speed mode or the accelerating mode varies inversely with a contact length between the workpiece and the wire.

In a fourth preferred form of the present invention, there in provided a wire saw slicing apparatus of the type in which a plurality of parallel, regularly spaced lines of a wire and a workpiece are relatively fed toward each other along a linear feed path to force them together while reciprocating the wire in the axial direction to slice the workpiece into wafers, with a slurry supplied to a contact area between the wire and the workpiece, the wire saw slicing apparatus comprising: (a) means for feeding one of the workpiece and the wire relative to the other along the linear food path to force them together; (b) means for reciprocating the wire in the axial direction; (c) means for setting a cycle pattern of the feed speed of the workpiece or the wire which recurs in a sequence of continuing at a constant speed, accelerating, continuing at the constant speed, decelerating, and continuing at the constant speed, and a cycle pattern of the reciprocating speed of the wire which recurs in a sequence of stopping, accelerating, continuing at a constant speed, decelerating, and stopping, the two cycle patterns being correlated with each other such that at least a time period during which the feed speed is in the continuing at the constant speed mode on the high speed side and a time period during which the reciprocating speed is in the continuing at the constant speed mode are synchronized with each other; and (d) means for controlling the operation of the feeding means and the reciprocating means according to the first and second cycle patterns set by the setting means.

In a fifth preferred form of the present invention, there is provided a wire saw slicing apparatus of the type in which a plurality of parallel, regularly spaced lines of a wire and a workpiece are relatively fed toward each other along a linear feed path to force them together while reciprocating the wire in the axial direction to slice the workpiece into wafers, with a slurry supplied to a contact area between the wire and the workpiece, the wire saw slicing apparatus comprising: (a) means for feeding one of the workpiece and the wire relative to the other along the linear feed path to force them together; (b) means for reciprocating the wire in the axial direction; (c) means for setting a cycle pattern of the feed speed of the workpiece or the wire which recurs in a sequence of continuing at a constant speed, accelerating, continuing at the constant speed, decelerating, and continuing at the constant speed, and a cycle pattern of the reciprocating speed of the wire which recurs in a sequence of stopping, accelerating, continuing at a constant speed, decelerating, and stopping, the two cycle patterns being correlated with each other much that at least the continuing at the constant speed mode on the low speed side of the feed speed cycle pattern and the stopping of the reciprocating speed cycle pattern are synchronized with each other; and (d) means for controlling the operation of the feeding means and the reciprocating means according to the first and second cycle patterns set by the setting means.

In the fourth and fifth preferred forms, the two cycle patterns are correlated such that at least the continuing at a constant speed mode on the low speed side of the feed speed cycle pattern and the stopping of the reciprocating speed cycle pattern are synchronized with each other, and a time period during which the feed speed is in the continuing at the constant speed mode on a high speed side and a time period during which the reciprocating speed is in the continuing at the constant speed mode are synchronized with each other.

In a sixth preferred form of the present invention, there is provided a wire saw slicing apparatus of the type in which a plurality of parallel, regularly spaced lines of a wire and a workpiece are relatively fed toward each other along a linear feed path to force them together while reciprocating the wire in the axial direction to slice the workpiece into wafers, with a slurry supplied to a contact area between the wire and the workpiece, the wire saw slicing apparatus comprising: (a) means for feeding one of the workpiece and the wire relative to the other along the linear feed path to force them together; (b) means for reciprocating the wire in the axial directions; (c) means for setting a cycle pattern of the feed speed of the workpiece or the wire which recurs in a sequence of accelerating, decelerating, accelerating, and a cycle pattern of the reciprocating speed of the wire which recurs in a sequence of stopping, accelerating, decelerating, and stopping, the two cycle patterns being correlated with each other such that at least a transitional part of the feed speed cycle pattern between the decelerating and the accelerating and the stopping of the reciprocating speed cycle pattern are synchronized with each other; and (d) means for controlling the operation of the feeding means and the reciprocating means according to the first and second cycle patterns set by the setting means.

In the sixth preferred form, one of the two cycle patterns may further have a mode of continuing at a constant speed provided between the accelerating and the decelerating.

In the fourth and fifth preferred forms of the present invention, the two cycle patterns set by the setting means are preferably composed of a repetition of a unit pattern. It is further preferable that each of the two cycle patterns set by the setting means are basically composed of a repetition of a unit pattern, and the feed speed of the workpiece or the wire in a transitional part of the feed speed cycle pattern between the accelerating and the decelerating varies inversely with a contact length between the workpiece and the wire.

The feed means preferably includes a drive motor rotatable to feed one of the workpiece and the wire relatively to each other along the linear feed path, and the reciprocating means preferably includes a drive motor rotatable to reciprocate the wire in the axial direction of the same. The controlling means preferably comprises a first controller for controlling the rotational speed of the drive motor of the feed means according to the feed speed cycle pattern set by the setting means, and a second controller for controlling the rotational speed of the drive motor of the reciprocating means according to the reciprocating speed cycle pattern net by the setting means.

In another aspect the invention provides a wire saw slicing method of the type in which a plurality of parallel, regularly spaced lines of a wire and a workpiece are relatively fed toward each other along a linear feed path to force them together while reciprocating the wire in the axial direction to slice the workpiece into wafers, with a slurry supplied to a contact area between the wire and the workpiece, the wire saw slicing method comprising the steps of; (a) feeding one of the workpiece and the wire relative to the other along the linear feed path to force them together at a speed having a first cycle pattern recurring in sequence of stopping, accelerating, continuing at a constant speed, decelerating, and stopping); (b) reciprocating the wire in the axial direction at a speed having a second cycle pattern recurring in a sequence of stopping, accelerating, continuing at a constant speed, decelerating, and stopping; and (c) synchronizing the first cycle pattern and the second cycle pattern at least through a time period during which the feed speed and the reciprocating speed continue at the respective constant speeds.

As a second preferred form of the method of this invention, there is provided a wire saw slicing method of the type in which a plurality of parallel, regularly spaced lines of a wire and a workpiece are relatively fed toward each other along a linear feed path to force them together while reciprocating the wire in the axial direction to slice the workpiece into wafers, with a slurry supplied to a contact area between the wire and the workpiece, the wire saw slicing method comprising the steps of: (a) feeding one of the workpiece and the wire relative to the other along the linear feed path to force them together at a speed having a first cycle pattern recurring in a sequence of stopping, accelerating, continuing at a constant speed, decelerating, and stopping; (b) reciprocating the wire in the axial direction at a speed having a second cycle pattern recurring in a sequence of stopping, accelerating, continuing at a constant speed, decelerating, and stopping; and (c) synchronising the first cycle pattern and the second cycle pattern at least at the time of the stopping of the respective speeds.

In the first and second preferred forms of the method of this invention, the first and second cycle patterns are preferably synchronized at least at the time of the stopping of the respective speeds and through a time period during which the feed speed and the reciprocating speed continue at the respective constant speeds.

As a third preferred form of the method, the invention provides a wire saw slicing method of the type in which a plurality of parallel, regularly spaced lines of a wire and a workpiece are relatively fed toward each other along a linear feed path to force them together while reciprocating the wire in the axial direction to slice the workpiece into wafers, with a slurry supplied to a contact area between the wire and the workpiece, the wire saw slicing method comprising the steps of: (a) feeding one of the workpiece and the wire relative to the other along the linear feed path to force them together at a speed having a first cycle pattern recurring in a sequence of stopping, accelerating, decelerating, and stopping; (b) reciprocating the wire in the axial direction at a speed having a second cycle pattern recurring in a sequence of stopping, accelerating, decelerating, and stopping; and (c) synchronizing the first cycle pattern and the second cycle pattern at least at the time of the stopping of the respective speeds.

In the third preferred form of the method of this invention, one of the first and second cycle patterns may further have a mode of continuing at a constant speed provided between the accelerating and the decelerating.

A fourth preferred form of the method of this invention is characterized by a wire saw slicing method of the type in which a plurality of parallel, regularly spaced lines of a wire and a workpiece are relatively fed toward each other along a linear feed path to force them together while reciprocating the wire in the axial direction to slice the workpiece into wafers, with a slurry supplied to a contact area between the wire and the workpiece, the wire saw slicing method comprising the steps of: (a) feeding one of the workpiece and the wire relative to the other along the linear feed path to force them together at a speed having a first cycle pattern recurring in a sequence of continuing at a constant speed, accelerating, continuing at the constant speed, decelerating, and continuing at the constant speed; (b) reciprocating the wire in the axial direction at a speed having a second cycle pattern recurring in a sequence of stopping, accelerating, continuing at a constant speed, decelerating, and stopping; and (a) synchronizing the first and second cycle patterns such that at least a time period during which the feed speed is in the continuing at the constant speed mode on the high speed side and a time period during which the reciprocating speed is in the continuing at the constant speed mode are synchronized with each other.

A fifth preferred form of the method of this invention in characterized by a saw slicing method of the type in which a plurality of parallel, regularly spaced lines of a wire and a workpiece are relatively fed toward each other along a linear feed path to force them together while reciprocating the wire in the axial direction to slice the workpiece into wafers, with a slurry supplied to a contact area between the wire and the workpiece, the wire saw slicing method comprising the steps of: (a) feeding one of the workpiece and the wire relative to the other along the linear feed path to force them together at a speed having a first cycle pattern recurring in a sequence of continuing at a constant speed, accelerating, continuing at the constant speed, decelerating, and continuing at the constant speed; (b) reciprocating the wire in the axial direction at a speed having a second cycle pattern recurring in a sequence of stopping, accelerating, continuing at a constant speed, decelerating, and stopping, and (c) synchronizing the first and second cycle patterns such that at least the continuing at a constant speed mode on the low speed side of the feed speed and the stopping of the reciprocating speed are synchronized with each other.

In the fifth preferred form of the method, the first and second cycle patterns are preferably synchronized such that at least a time period during which the feed speed is in the continuing at the constant speed mode on the high speed side and a time period during which the reciprocating speed is in the continuing at the constant speed mode are synchronized with each other, and the continuing at a constant speed mode on the low speed side of the first cycle pattern and the stopping of the second cycle pattern are synchronized with each other.

A sixth preferred form of the method of this invention is characterized by a wire saw slicing method of the type in which a plurality of parallel, regularly spaced lines of a wire and a workpiece are relatively fed toward each other along a linear feed path to force them together while reciprocating the wire in the axial direction to slice the workpiece into wafers, with a slurry supplied to a contact area between the wire and the workpiece, the wire saw slicing method comprising the steps of: (a) feeding one of the workpiece and the wire relative to the other along the linear feed path to force them together at a speed having a first cycle pattern recurring in a sequence of accelerating, decelerating, and accelerating; (b) reciprocating the wire in the axial direction at a speed having a second cycle pattern recurring in a sequence of stopping, accelerating, decelerating, and stopping; and (c) synchronizing the first and second cycle patterns such that at least a transitional part of the first cycle pattern between the decelerating and the accelerating and the stopping of the second cycle pattern are synchronized with each other.

In the sixth preferred form of the method, one of the first and second cycle patterns may further have a mode of continuing at a constant speed provided between the accelerating and the decelerating.

The workpiece to be sliced by the apparatus and method of the present invention is composed, for example, of a semiconductor single crystal ingot.

In view of the abrasive wear and cutting efficiency of a wire, the conventionally used wire saw slicing apparatus cuts off or slices a workpiece by reciprocating the wire in a like manner as a saw used for cutting lumbers.

To reciprocate the wire, a cycle pattern recurring in a sequence of stopping, accelerating, continuing at a constant speed, decelerating, and stopping is used instead of a mere repetition of alternating stopping and constant speed modes. It is also possible to employ another cycle pattern which recurs in a sequence of stopping, accelerating, decelerating, and stopping.

The slicing speed which is represented by a speed of downward movement of the workpiece or a speed of linear movement of the wire is constant in general. In a particular case, however, the slicing speed may be varied linearly according to a certain principle.

Accordingly, even when the reciprocating movement of the wire is stopped or continues at a slow speed, the workpiece or the wire is fed linearly at the same speed an provided when the wire is reciprocating at a constant speed. Consequently, sliced wafer necessarily have a deformation of undulations (waviness) corresponding to the period of reciprocation of the wire. The deformation of undulations (waviness) cannot be removed by a subsequent working process such as lapping but lowers the yield of semiconductor devices formed on the sliced wafer.

The foregoing problems are solved by the present invention in which the linear feed speed of the workpiece or the wire is changed in synchronism with the period of reciprocation of the wire to produce as-sliced wafers having no undulations (waviness) on the sliced surface.

The linear feed speed of the workpiece or the wire has a cycle pattern, and the reciprocating speed of the wire has a cycle pattern. The two cycle patterns are synchronized with each other at least at the time of stopping of the respective speeds and through a time period during which the respective feed speeds continue at their constant speeds. More concretely, through a time period during which the reciprocating movement of the wire is accelerated from stopping to a constant speed, or decelerated from the constant speed, the linear feed of the workpiece or the wire is temporarily stopped or slowed down to an extent not affecting the slicing operation.

A further advantageous effect attainable by the foregoing arrangement of the present invention is that a slack control as required for the wire in the conventional slicing process is of no importance to the wire of the present invention because a sag or slack in the wire can be taken up as the wire restores its original state under the resiliency thereof while the linear movement of the workpiece or the wire is stopped or continues at a low speed. Thus, the wire of the present invention is substantially free from breakage.

The above and other objects, features and advantage of the present invention will become manifest to those versed in the art upon making reference to the detailed description and the accompanying sheets of drawings in which preferred structural embodiments of the invention are shown in by way of illustrative example.

DETAILED DESCRIPTION OF THE INVENTION

The present invention will be described below in greater detail with reference to a first embodiment shown in FIGS. 1 through 5.

Figure 2:
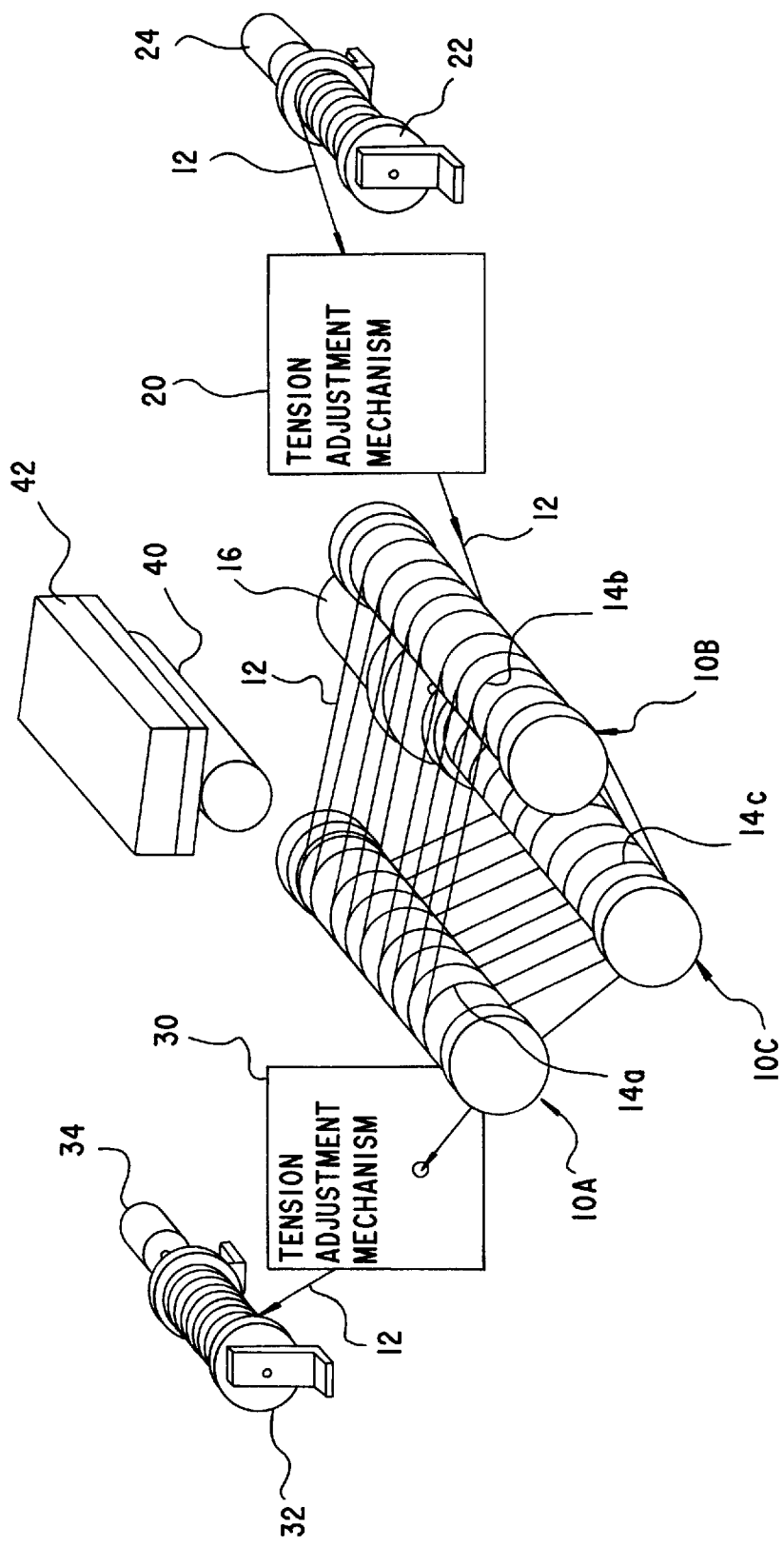
FIG. 2 is a diagrammatical perspective view of a main portion of the wire saw slicing apparatus.

As shown in FIG. 2, a wire saw slicing apparatus according to the first embodiment of this invention includes three plastics main rollers 10A, 10B and 10C of the identical construction disposed with their axes parallel spaced from one another, and a wire 12 wound spirally around helical groove 14a, 14b and 14c formed at regular intervals or pitches in the respective outer peripheral surfaces of the main rollers 10A–10C. The main rollers may be plural in number and should by no means be limited to any particular number, but four or three main rollers as in the illustrated embodiment are used in general. The main roller 10C constitutes a drive roller and is connected in driven relation to a drive motor 16. A rotary motion of the main roller 10C in transmitted via the wire 12 to the remaining main rollers 10A, 10B which constitute driven rollers.

The wire 12 has one or a leading end portion wound around a wire take-up drum 22 via a tension adjustment mechanism 20. The wire take-up drum 22 is rotatably driven by a torque motor 24. A tension on a portion of the wire 12 extending between the tension adjustment mechanism 20 and the wire take-up drum 22 is regulated according to a voltage applied to the torque motor 24. A tension on a portion of the wire 12 running between the tension adjustment mechanism 20 and the drive roller 10C is adjusted at a constant value by the tension adjustment mechanism 20.

Similarly, the opposite or a trailing end portion of the wire 12 in wound around a wire take-up drum 32 via a tension adjustment mechanism 30, The wire take-up drum 32 in rotatably driven by a torque motor 34. A tension on a portion of the wire 12 extending between the tension adjustment mechanism 30 and the wire take-up drum 32 is regulated according to a voltage applied to the torque motor 34. A tension on a portion of the wire 12 running between the tension adjustment mechanism 30 and the drive roller 10C is adjusted at a constant value by the tension adjustment mechanism 30.

A workpiece 40 is composed, for example, of a semiconductor single crystal ingot having a flat orientation 15 and attached by bonding to a workpiece holder 42 via the orientation flat. The workpiece holder 42 is vertically moved up and down along a linear path by means of an arrangement shown in FIG. 1.

Figure 1:
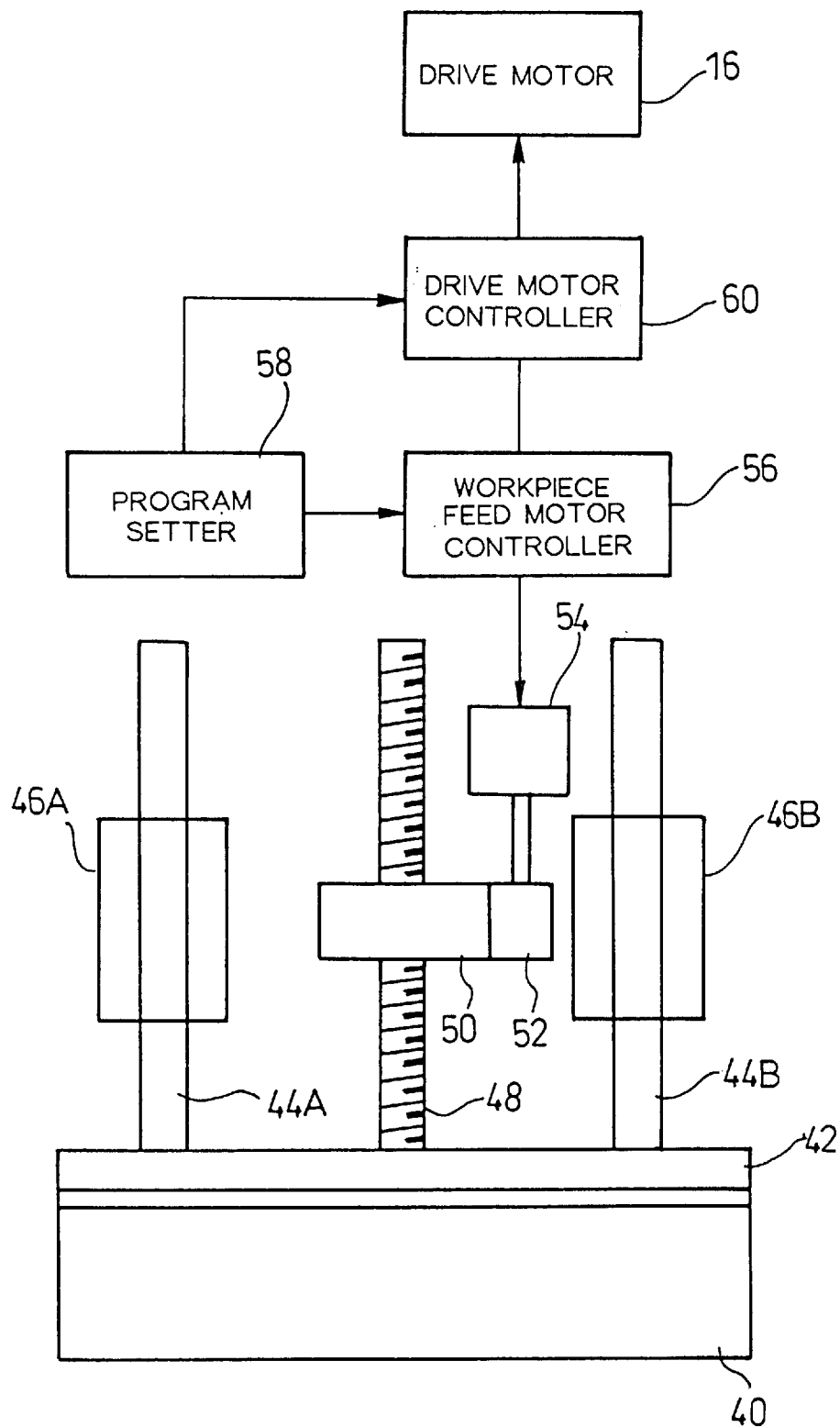
FIG. 1 is a partly pictorial block diagram showing the general construction of a wire saw slicing apparatus according to a first embodiment of the present invention.

As shown in FIG. 1, a vertical shaft 44A is connected at one end to an upper surface of the workpiece holder 42 in proximity of one end of the workpiece holder 42. The vertical shaft 44A slidably extends through a fixed vertical guide cylinder 46A for vertical reciprocation relative to the fixed guide cylinder 46A. A similar vertical shaft 44B is connected at one end to the upper surface of the workpiece holder 42 in proximity of the other end of the workpiece holder 42. The vertical shaft 44B slidably extends through a fixed vertical guide cylinder 46B for vertical reciprocation relative to the fixed guide cylinder 46B. A vertical feed screw 48 is connected at one end to a central portion of the upper surface of the workpiece holder 42. The feed screw 48 in threaded with an internally threaded hole (not shown) in a gear 50. The gear 50 is rotatably driven by a workpiece feed motor 54 via a speed reducer 52.

A workpiece holder feed motor controller 56 controls a rotational speed of the workpiece feed motor 54 according to rotational speed patterns set for the workpiece feed motor 54 in a program-setting unit or setter 58. Similarly, a drive motor controller 60 controls a rotational speed of the drive motor 16 according to rotational speed patterns set for the drive motor 16 in the program setter 58.

The wire saw slicing apparatus of the foregoing construction operates as follows.

The workpiece feed motor 54 is driven to lower the workpiece holder 42 toward a plurality of parallel regularly spaced lines or portions of the wire 12 until the workpiece 40 held on the workpiece holder 42 is in contact with the wire 12 (FIG. 2). At the same time, the drive roller 10C is rotated by the drive motor 16 to reciprocate the wire 12 in the axial or longitudinal direction thereof. A slurry (a working fluid containing abrasive grain) is supplied to a contact area between the workpiece 40 and the wire 12. While keeping this condition, the workpiece 40 is further moved downwards whereby the workpiece 40 in sliced at one time into a multiplicity of wafers by a lapping action attained by the reciprocating wire 12 and the slurry supplied thereto.

Figure 3:
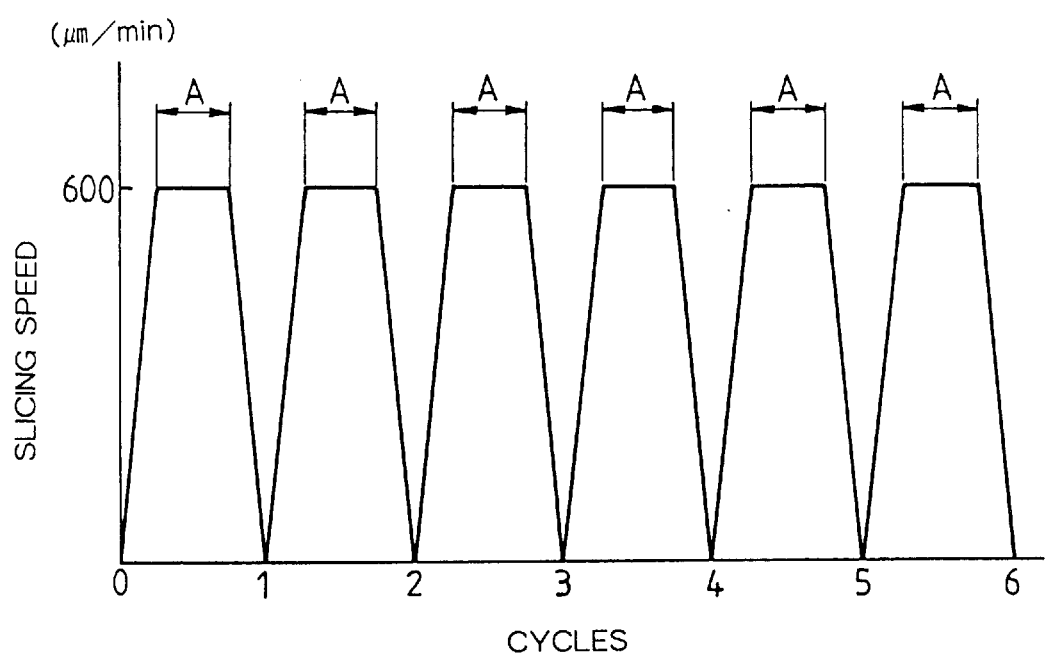
FIG. 3 is a graph showing one example of the cycle pattern of the workpiece slicing speed.

FIG. 3 shows one example of a cycle pattern of the working or slicing speed of the workpiece 40 which is represented by the relation between the slicing speed and the number of cycles taken after the start of a slicing operation. The program setter 58 contains a workpiece feed motor rotational speed pattern (a pattern of rotational speed of the workpiece feed motor 54) which corresponds to the cycle pattern shown in FIG. 3. In the illustrated example, the slicing speed has a cycle time of one hour, and within the one-hour cycle time, the slicing speed goes up from 0 $\mu$m/min to 600 $\mu$m/min, subsequently continues at 600 $\mu$m/min for a predetermined period of time A, and thereafter goes down from 600 $\mu$m/min to 0 $\mu$m/min. Such a unit cycle pattern is repeated 6 times to slice one workpiece 40. In a first embodiment of the present invention, the cycle pattern of workpiece slicing speed needs to have a pattern recurring in a sequence of stopping, accelerating, continuing at a constant speed, decelerating, and stopping. The cycle time or period of the workpiece slicing speed cycle pattern has no particular limitation, so that any desired cycle pattern can be set for the workpiece slicing speed.

Figure 4:
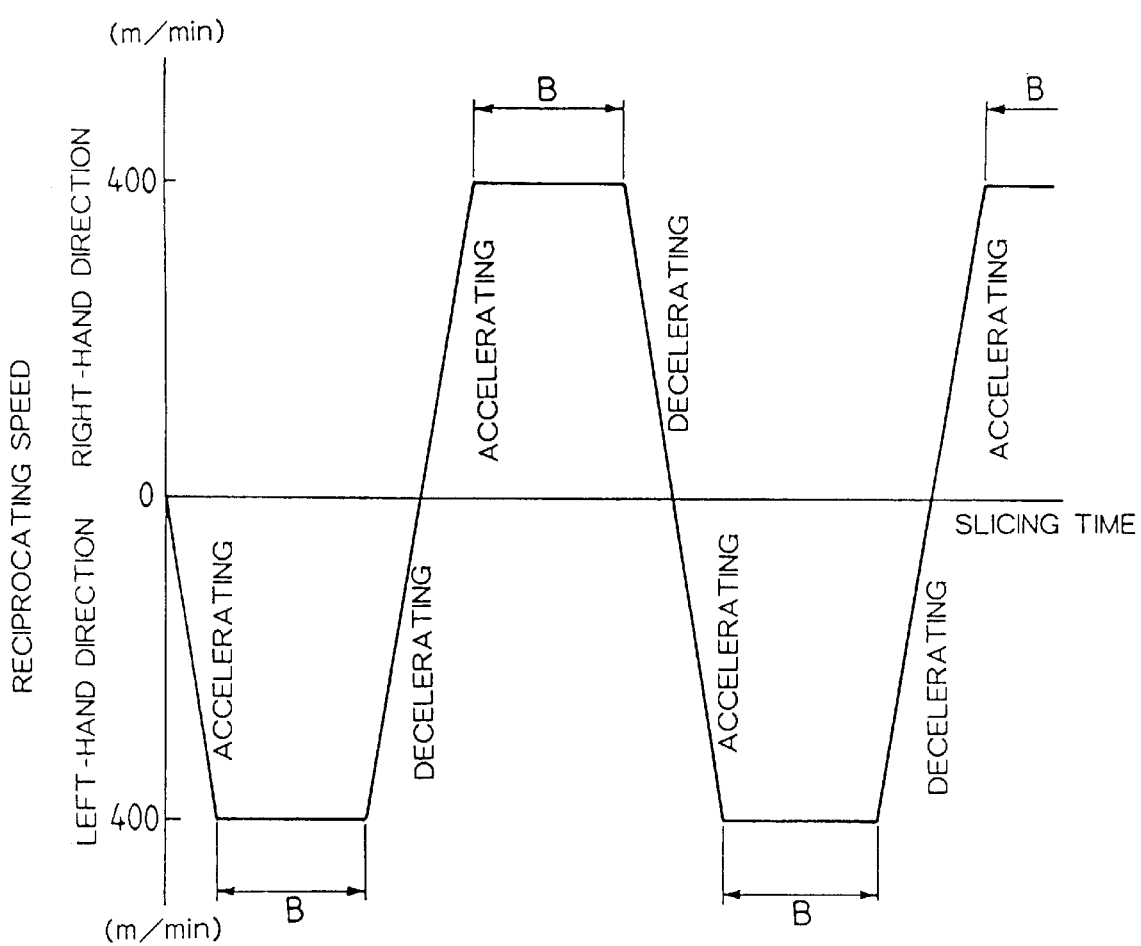
FIG. 4 is a graph showing one example of the wire reciprocating speed.

FIG. 4 illustrates one example of a cycle pattern of the wire reciprocating speed. The program setter 58 contains a drive motor rotational speed pattern (a pattern of rotational speed of the drive motor 16) which corresponds to the illustrated wire reciprocating speed pattern. In the illustrated example, the wire reciprocating speed has a cycle time of one hour. In a first one-hour cycle time or period, the wire reciprocating speed goes up from 0 m/min to 400 m/min for a forward stroke or movement in one or the left-hand direction, subsequently continues at 400 m/min for a predetermined period of time B, and thereafter goes down from 400 m/min to 0 m/min for a backward stroke or movement in the opposite or the right-hand direction. In the next follow one-hour cycle time, the wire reciprocating speed goes up from 0 m/min to 400 m/min for a forward stroke or movement in one or the right-hand direction, subsequently continues at 400 m/min for a predetermined period of time B, and thereafter goes down from 400 m/min to 0 m/min for a backward stroke or movement in the opposite or the left-hand direction.

The cycle pattern in the first cycle time and the cycle pattern in the next following cycle time are identical with each other but opposite in direction. In the example shown in FIG. 4, the cycle pattern in each direction of the wire reciprocating speed is repeated three times to slice one workpiece 40. In the first embodiment of the present invention, the cycle pattern of wire reciprocating speed needs to have a pattern recurring in a sequence of stopping, accelerating, continuing at a constant speed, decelerating, and stopping. The cycle time or period of the wire reciprocating speed cycle pattern has no particular limitation, so that any desired cycle pattern can be set for the wire reciprocating speed.

One important feature of the present invention resides in that the cycle pattern of the workpiece slicing speed, namely the cycle pattern of the feed speed of the workpiece relative to the wire along a linear path, and the cycle pattern of the wire reciprocating speed are synchronized with each other.

Figure 5:
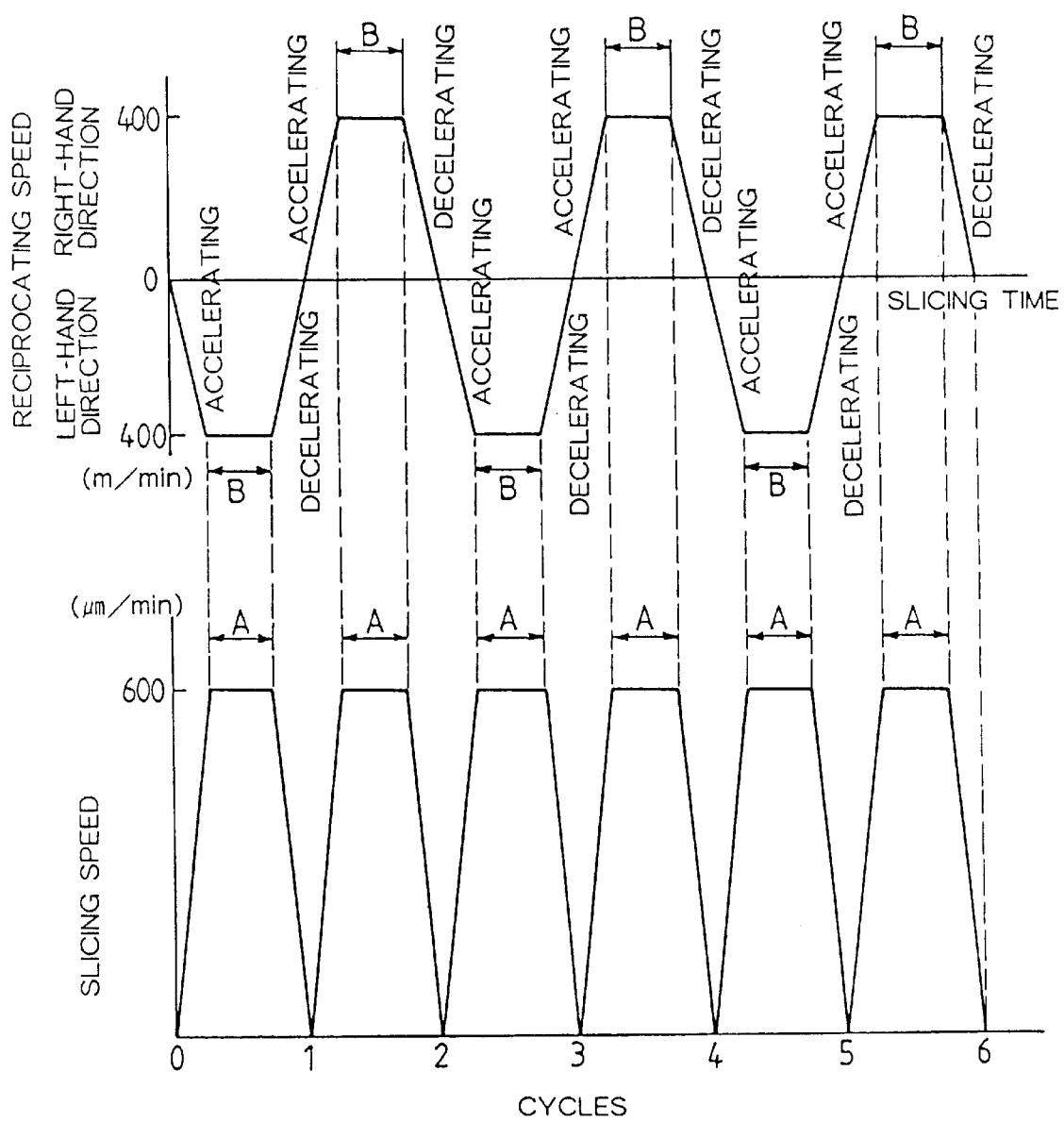
FIG. 5 is a graphical representation of the condition in which the cycle pattern of the workpiece slicing speed and the cycle pattern of the wire reciprocating speed are synchronized with each other.

The aforesaid synchronization between the cycle pattern of the workpiece slicing speed and the cycle pattern of the wire reciprocating speed means that, as shown in FIG. 5, at least the time period A during which the workpiece slicing speed continues at a constant value (600 μm/min in the example shown in FIG. 5) and the time period B during which the wire reciprocating speed continues at a constant value (400 m/min in the example shown in FIG. 5) are synchronized with each other.

The workpiece slicing speed and the wire reciprocating speed also have additional items that can be synchronized with each other, namely, the stopping time period, the accelerating time period, and the decelerating time period. It is most preferable that the workpiece is stopped while the wire is stopping. However, the workpiece may be moved or fed at a low speed while the wire is stopping. It is also preferable that the workpiece is stopped while the wire is accelerating or decelerating. As an alternative, the workpiece may be moved or fed at a low speed while the wire it in accelerating or decelerating.

Figure 6:
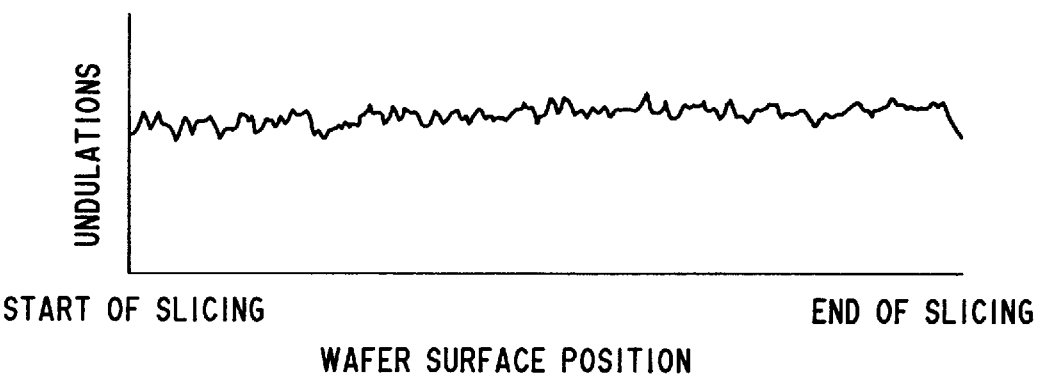
FIG. 6 is a graph showing a surface configuration of an as-sliced wafer.
Figure 9:
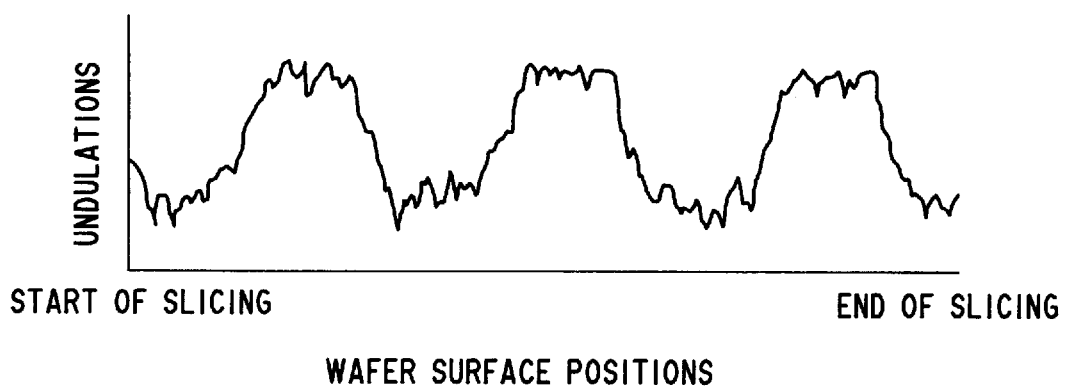
FIG. 9 is a graph showing a surface configuration of a wafer sliced according to a conventional method.

It was experimentally proved that as-sliced wafers having an ideal shape (i.e., a flat wafer) with negligible irregularities or undulations (waviness) on the sliced surface, such as shown in FIG. 6, could be obtained by a slicing operation performed under the condition in which at least the time period A and the time period B are synchronized with each other. On the contrary, it was also proved by experiment that a slicing operation achieved with the workpiece slicing speed cycle pattern shown in FIG. 3 combined asynchronously with the wire reciprocating speed pattern of FIG. 4 produced wafers having noticeable undulations (waviness) on the sliced surface, as shown in FIG. 9. FIGS. 6 and 9 each illustrate the result of a measurement on the surface roughness of a sliced wafer using a surface roughness tester. In each of FIGS. 6 and 9, the vertical axis represents undulations (waviness) on the measured wafer surface, and the horizontal axis represents measured positions on the wafer surface taken in the slicing direction.

Figure 7:
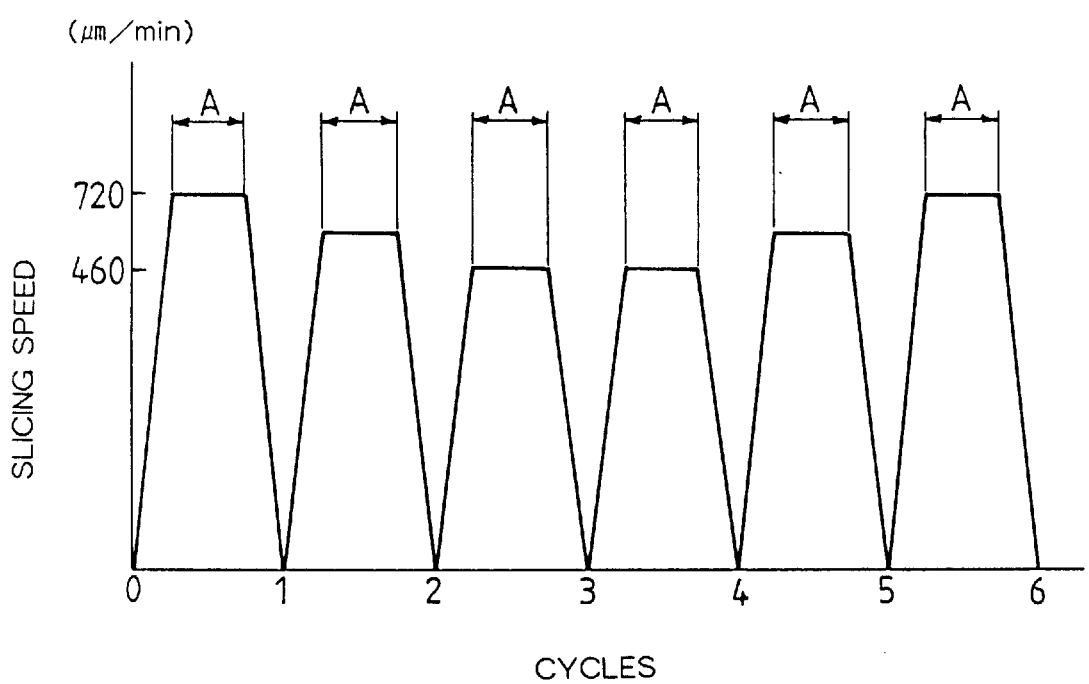
FIG. 7 is a graph showing another example of the cycle pattern of the workpiece slicing speed.

FIG. 7 shows another example of the workpiece slicing speed cycle pattern taken over several numbers of cycles after the start of a slicing operation. In this example, the maximum workpiece slicing speed in each cycle time or period decreases with an increase in effective diameter "d" of the workpiece 40 being sliced (or a contact length between the wire 12 and the workpiece 40 being sliced) so that slicing resistance in the individual cycles can be made substantially equal throughout the slicing operation.

The workpiece slicing speed cycle pattern thus arranged is able to equalize the amplitude of undulations (waviness) formed during each cycle time on the surface of a sliced wafer 40, thereby reducing or smoothing the undulations (waviness) to a greater extent than an obtained the cycle pattern shown in FIG. 3.

The workpiece slicing speed cycle pattern shown in FIG. 7, when combined with the wire reciprocating speed cycle pattern of FIG. 4 in a like synchronized condition or state as shown in FIG. 5, the same advantageous effects of the present invention can be also attained.

Figure 8:
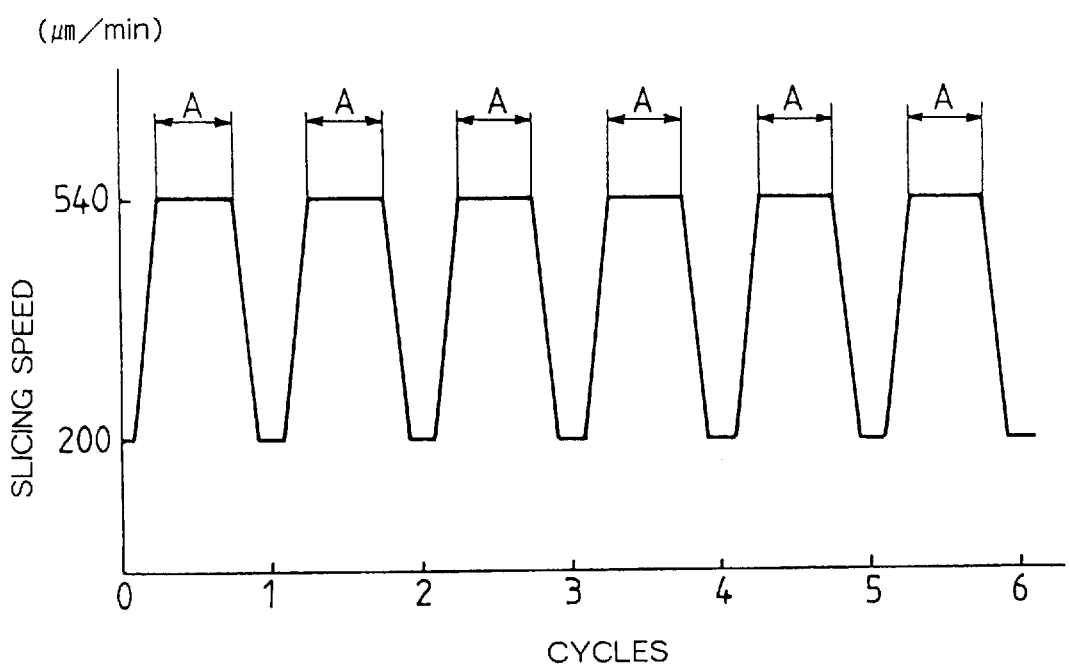
FIG. 8 is a graph showing still another example of the workpiece slicing speed.

FIG. 8 illustrates still another example of the workpiece slicing speed cycle pattern taken over several cycles after the start of a slicing operation. In thin example, the workpiece slicing speed i set to periodically change in the range of 200 gm/min to 540 m/min, with an average slicing speed kept higher than that of the cycle pattern shown in FIG. 3.

The workpiece slicing speed cycle pattern shown in FIG. 8 may be combined in a synchronized state (not shown) with the wire reciprocating speed cycle pattern of FIG. 4, in which instance the same advantageous effects of the invention as described above can be achieved.

It will be appreciable that many variations of the workpiece slicing speed cycle patterns and the wire reciprocating speed cycle pattern described and illustrated herein are possible in the light of the above teaching. All such variations an reasonably and properly come within the scope of the technical idea of the present invention may be combined in various appropriate manners to attain the same advantageous effects as described above.

In the illustrated embodiments, the wire saw slicing apparatus is so constructed as to feed the workpiece along a linear path to force the same against the wire. The present invention is also useful when embodied in a wire saw slicing apparatus of the type in which the wire is fed along a linear path and forced against the workpiece during the slicing process.

As described above, according to the present invention, a workpiece such as a silicon single crystal ingot can be sliced into a multiplicity of wafers with no surface undulations (waviness) and kerf lose involved and with good yield resulting therefrom.

Obviously, various minor changes and modifications of the present invention are possible in the light of the above teaching. It is therefore to be understood that within the scope of appended claims the invention may be practiced otherwise than as specifically described.

What is claimed is:

1. A wire saw slicing method in which a plurality of parallel, regularly spaced lines of a wire and a workpiece are relatively fed toward each other along a linear feed path to force the wire and workpiece together while reciprocating the wire in an axial direction to slice the workpiece into wafers, with a slurry supplied to a contact area between the wire and the workpiece, said wire saw slicing method comprising the steps of:

(a) feeding one of the workpiece and the wire relative to each other along the linear feed path to force the workpiece and the wire together at a speed having a first cyclic pattern, said first cyclic pattern having a plurality of modes which form one cycle of the first cyclic pattern;

(b) reciprocating the wire in the axial direction at a reciprocating speed having a second cyclic pattern, said second cyclic pattern having a plurality of modes which form one cycle of the second cyclic pattern; and (c) synchronizing said first cyclic pattern and said second cyclic pattern at least during a time period of one of the modes of the respective cyclic patterns.

2. A wire saw slicing method according to claim 1, wherein said first cyclic pattern recurs in a mode sequence of stopping, accelerating, continuing at a constant speed, decelerating and stopping, said second cyclic pattern recurs in a mode sequence of stopping, accelerating, continuing at a constant speed, decelerating, and stopping, said synchronizing step is effected at least through a time period during which said feed speed and said reciprocating speed continue at the respective constant speeds.

3. A wire saw slicing method according to claim 1, wherein said first cyclic pattern recurs in a mode sequence of stopping, accelerating, continuing at a constant speed, decelerating and stopping, said second cyclic pattern recurs in a mode sequence of stopping, accelerating, continuing at a constant speed, decelerating, and stopping, and said synchronizing step is effected at least at the time of said stopping of the respective speeds.

4. A wire saw slicing method according to claim 1, wherein said first cyclic pattern recurs in a mode sequence of stopping, accelerating, continuing at a constant speed, decelerating, and stopping, said second cyclic pattern recurs in a mode sequence of stopping, accelerating, continuing at a constant speed, decelerating, and stopping, and said synchronizing step is effected at least at the time of said stopping of the respective speeds and through a time period during which said feed speed and said reciprocating speed continue at the respective constant speeds.

5. A wire saw slicing method according to claim 1, wherein said first cyclic pattern recurs in a mode sequence of stopping, accelerating, decelerating, and stopping, said second cyclic pattern recurs in a mode sequence of stopping, accelerating, decelerating, and stopping, and said synchronizing step is effected at least at the time of said stopping of the respective speeds.

6. A wire saw slicing method according to claim 5, wherein one of said first and second cyclic patterns further has a mode of continuing at a constant speed provided between said accelerating and said decelerating.

7. A wire saw slicing method according to claim 1, wherein said first cyclic pattern recurs in a mode sequence of continuing at a constant speed, accelerating, continuing at the constant speed, decelerating and continuing at the constant speed, said second cyclic pattern recurs in a mode sequence of stopping, accelerating, continuing at a constant speed, decelerating, and stopping, and said synchronizing step is effected such that at least a time period during which said feed speed is in said continuing at the constant speed mode on a high speed side and a time period during which said reciprocating speed is in said continuing constant speed mode are synchronized with each other.

8. A wire saw slicing method according to claim 1, wherein said first cyclic pattern recurs in a mode sequence of continuing at the constant speed, accelerating, continuing at a constant speed, decelerating, and continuing at the constant speed, said second cyclic pattern recurs in a mode sequence of stopping, accelerating, continuing at a constant speed, decelerating, and stopping, and said synchronizing step is effected such that at least said continuing at a constant speed mode on a low speed side of the feed speed and said stopping of the reciprocating speed are synchronized with each other.

9. A wire saw slicing method according to claim 1, wherein said first cyclic pattern recurs in a mode sequence of continuing at a constant speed, accelerating, continuing at the constant speed, decelerating, and continuing at the constant speed, said second cyclic pattern recurs in a mode sequence of stopping, accelerating, continuing at a constant speed, decelerating, and stopping and said synchronizing step is effected such that at least a time period during which said feed speed is in said continuing at the constant speed mode on a high speed side and a time period during which said reciprocating speed is in said continuing at the constant speed mode are synchronized with each other, and said continuing at the constant speed mode on a low speed side of said first cyclic pattern and said stopping of said second cyclic pattern are synchronized with each other.

10. A wire saw slicing method according to claim 1, wherein said first cyclic pattern recurs in a mode sequence of accelerating, decelerating, and accelerating, said second cyclic pattern recurs in a mode sequence of stopping, accelerating, decelerating, and stopping and said synchronizing step is effected such that at least a transitional part of said first cyclic pattern between said decelerating and said accelerating and said stopping of said second cyclic pattern are synchronized with each other.

11. A wire saw slicing method according to claim 10, wherein one of said first and second cyclic patterns further has a mode of continuing at a constant speed provided between said accelerating and said decelerating.

* * * * *